3,267,067
MERCAPTAN STABILIZERS FOR CONTROL OF DECREASE IN PLASTICITY OF RECLAIMED RUBBER
John M. Mersereau, Cheshire, and Paul J. Mester, Naugatuck, Conn., assignors to United States Rubber Company, New York, N.Y., a corporation of New Jersey
Filed Jan. 17, 1963, Ser. No. 252,191
8 Claims. (Cl. 260—45.7)

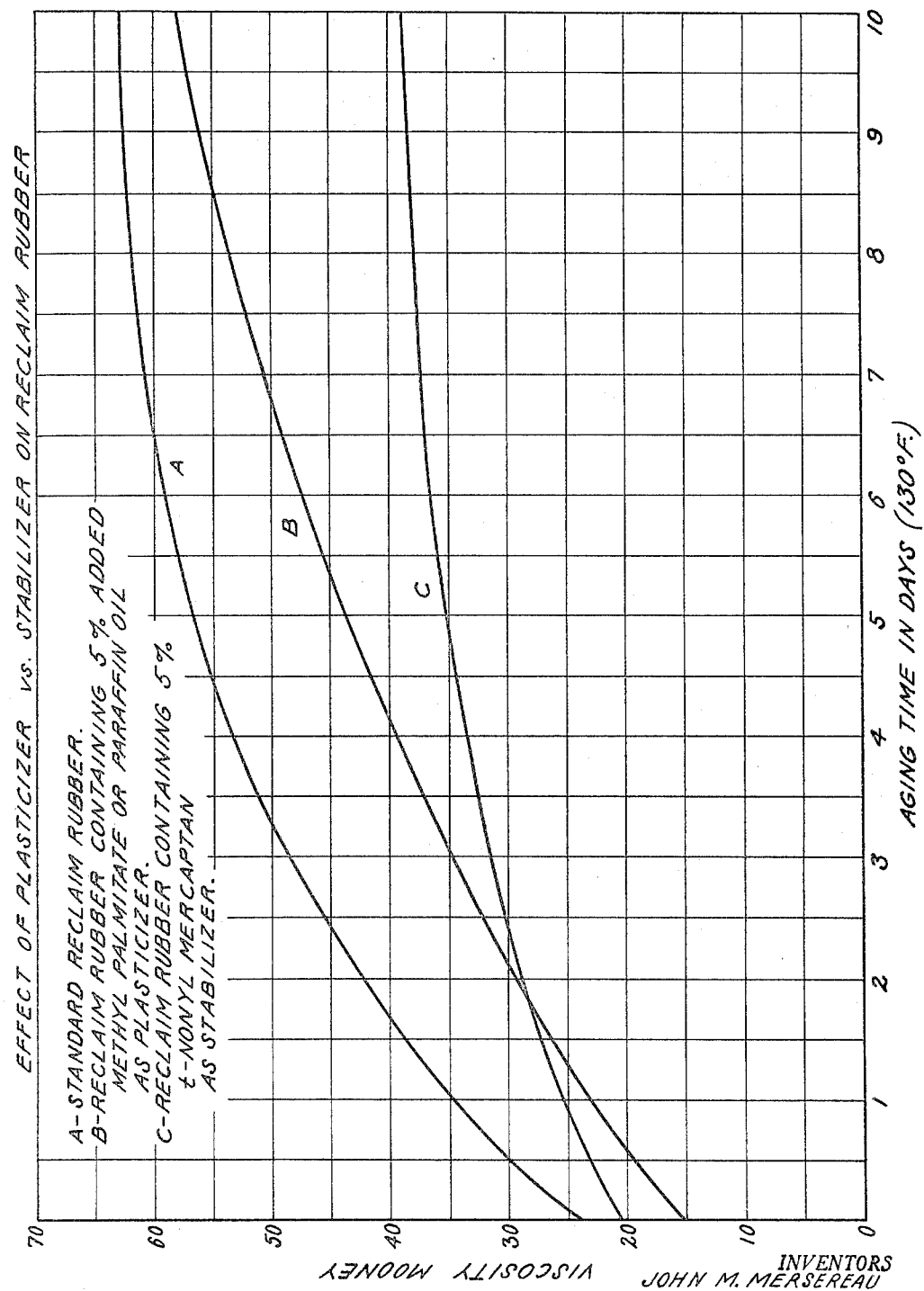

This invention relates to improvements in the reclaiming of rubber from vulcanized products. More particularly, the invention relates to the use of mercaptan stabilizers to control the decrease in plasticity (increase in viscosity) of reclaimed rubber that normally occurs during storage.

The reclaiming of rubber from waste vulcanized materials, such as old tires, shoes, mechanical goods, etc., is an old and well established industry. Reclaimed rubber or simply "reclaim," as it is known by those skilled in the art, is the product resulting from the treatment of scrap rubber vulcanizates with heat, plasticizers (softeners) and chemical agents in order to sufficiently soften or plasticize said vulcanizates. This treatment increases the plasticity and decreases the viscosity of the waste rubber. New rubber and various compounding and vulcanizing ingredients may then be incorporated with the reclaimed rubber in accordance with established manufacturing procedures to produce new articles of manufacture, after vulcanization. Further details on the reclaiming of rubber may be found in the Vanderbilt Rubber Handbook, 1958, in the chapter entitled "Reclaimed Rubber," pages 102–115.

Many reclaims thus produced exhibit an undesirable decrease in plasticity (increase in viscosity) upon aging, which begins immediately after the reclaiming operation and continues for an indefinite time thereafter. The extent of this plasticity decrease may be such as to more than triple the Mooney viscosity (MSR-1, 1½ min. at 180° F., small rotor) under such adverse conditions as high temperature. This hardening of the reclaim is a disadvantage in the subsequent uses of the material. Lack of uniformity of plasticity in reclaimed stocks of different ages and the longer mixing cycles required with the lower plasticity rubbers are typical problems encountered by users of reclaimed rubber. Until now, no satisfactory method has been found to retard the decrease in plasticity upon natural aging.

We have now found that the incorporation of 0.5% to 10% by weight of a mercaptan stabilizer into the reclaimed rubber retards the plasticity decrease to an enormous degree. Thus, a reclaim whose viscosity increased over a given period of time from a Mooney viscosity value of 30 to a value of 100, i.e., a 233% increase, exhibited an increase of only 134% in the same time period after incorporation of 2% by weight of 2-mercaptoethanol, one of the mercaptan stabilizers of this invention. The use of larger quantities of 2-mercaptoethanol will induce even greater stability in the reclaimed rubber.

The number of chemical substances which have been used as simple plasticizers for rubber and reclaimed rubber is very great and certainly the mercaptans are among them. See such patents as U.S. 2,338,427; U.S. 2,415,449; U.S. 2,593,279; U.S. 2,653,915; and U.S. 2,695,898. For this reason, we wish to emphasize that the mercaptans of this invention are intended for use as plasticity stabilizers for the reclaimed rubber rather than plasticizers of reclaim. By "plasticity stabilizer" is meant a substance which inhibits any decrease in plasticity (increase in viscosity) of the reclaim with time. In contrast, a "plasticizer" is a softener which decreases the initial viscosity (increases the initial plasticity) of a material. However, a plasticizer per se necessarily need not possess any particular ability to inhibit subsequent increases in the viscosity.

It is an express limitation of our invention that the rubber reclaim to which the instant mercaptan plasticity stabilizers are added after reclaiming effectively contains none of the mercaptans of this invention, i.e. either the rubber was reclaimed in the absence of such mercaptans by using nonmercaptan plasticizers or the mercaptan plasticizers used in reclaiming were decomposed to such an extent as to possess, in their residual states and amounts in the reclaim, a negligible plasticity stabilizing effect. Obviously, as the mercaptan plasticity stabilizer is being added to the reclaimed rubber (reclaim), the method of our invention contemplates and is restricted to the addition of the stabilizer after the standard reclaim process presently known and used in the art.

Illustrative of this distinction are the three curves of the accompanying graph representing viscosity as a function of aging time (in days at 130° F.). Curve A represents the hardening of pure reclaimed rubber; Curve B represents that of the same reclaimed rubber containing 5% of an added simple plasticizer (e.g., methyl palmitate or paraffin oil); Curve C represents a sample of the same reclaimed rubber containing 5% of a mercaptan plasticity stabilizer (t-nonyl mercaptan). It is of some interest that despite the presence of a plasticity stabilizer, some hardening is always observed (Curve C) in reclaim, although it may be very slight.

The cause of the viscosity rise and the reason for the stabilizing effect of mercaptans are not known. However, the effect of mercaptan is certainly of a chemical nature. Possible explanations for the stabilization imparted by mercaptans are (1) Hydrogen transfer reactions from the mercaptans to radicals present in the reclaim, and (2) Reduction processes, especially the reduction of disulfides, peroxides, and quinones present in the reclaim. Some evidence has been found to favor the latter explanation, but nevertheless the former cannot be completely excluded.

The active viscosity-stabilizing group in mercaptans is the

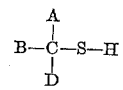

group. The symbols A, B and D signify hydrogen atoms, hydrocarbon radicals (aliphatic or aromatic), or substituted hydrocarbon radicals (e.g., $CH_2CH_2OH$); C, S, and H signify a carbon atom, a sulfur atom, and a hydrogen atom, in that order. The aliphatic hydrocarbon radicals may be alkyl (preferably from $C_4$ through $C_{16}$) or cycloalkyl. The aromatic radicals include, by way of non-limiting example, the phenyl, tolyl, xylyl, and naphthyl radicals.

Specific examples of compounds included in the above cited generic classes are benzyl mercaptan ($C_6H_5CH_2SH$), B-mercaptoethanol ($HOCH_2CH_2SH$), t-butyl mercaptan [$(CH_3)_3CSH$] and benzene thiol ($C_6H_5SH$). The last named compound is representative of compounds in which the central carbon atom (C) in the preceding generic formula comprises part of a ring. Although all mercaptans—aliphatic, aromatic, primary or tertiary—display a stabilizing effect in reclaim, the most active mercaptans are 2-mercapto ethanol and 2-mercapto naphthalene, but these are quite expensive. Practically speaking, the best mercaptans are t-nonyl, t-octyl, and phenyl mercaptans (including the homologues, e.g., tolyl and xylyl mercaptans). Naturally in commercial applications these mercaptans may contain impurities or mixtures and crude reaction products containing the mercaptans may be used.

Excluded from this disclosure as plasticity stabilizers are the disulfides (such as dicresyl $S_2$), the polysulfides, and the mercaptan salts (such as $Ca(S\phi)_2$ where $\phi$ represents the phenyl radical $C_6H_5$) as some of these substances have been found to process negligible plasticity stabilizing action.

The effect of the plasticity stabilizers of this invention is most noticeable in reclaims of rubbers such as natural and styrene-butadiene synthetic rubbers, which normally exhibit a very serious hardening, and less appreciable in reclaims of those rubbers, such as butyl rubber, which display little hardening.

The following examples are illustrative of our invention. All Mooney viscosities are in units of MSR 1, 1½ minutes at 180° F., small rotor. All reclaims were prepared, without using mercaptan plasticizers, by a standard reclaiming technique.

EXAMPLE 1

Into 1000 g. of a whole tire scrap reclaim comprising about equal parts of SBR and natural rubber was mill-mixed at 135–145° F. 50 g. of 2-mercaptonaphthalene as a viscosity stabilizer. The Mooney viscosity of the product was 18. A similarly milled sample containing no mercaptan possessed a Mooney viscosity of 35. During aging at 130° F. for 30 days the plasticity of the stabilized sample rose 40 points while that of the unstabilized sample rose 78 points.

EXAMPLE 2

Into 1150 g. of a reclaim identical in type with that of Example 1 was Banbury-mixed 11.5 g. of t-octyl mercaptan. The product possessed a viscosity of 28. After standing at room temperature in air for two months its viscosity had risen only 23 points. A similarly treated control sample containing no mercaptan exhibited a viscosity rise of 36 points.

EXAMPLE 3

Into a fresh 2500 g. sample of a mixed passenger tire non-staining (not causing white sidewall discoloration due to plasticizer migration) reclaim comprising about equal parts of natural and SBR synthetic rubber was Banbury-mixed 25 g. of t-nonyl mercaptan. The product possessed a Mooney viscosity of 24 while a similarly treated control sample possessed a Mooney of 26. After 20 days aging at 130° F. the reclaims possessed viscosities of 67 and 94, respectively.

EXAMPLE 4

Into a fresh 1150 g. sample of reclaim as in Example 1 was Banbury-mixed 23 g. of 2-mercaptoethanol. The viscosities of the product before and after 20 days aging at 130° F. were 24 and 56 respectively; whereas a similarly treated control sample containing no mercaptan possessed Mooneys of 30 and 100, respectively.

EXAMPLE 5

Into 2500 g. of fresh reclaim of the type in Example 1 was Banbury-mixed 125 g. of paraffin oil as a plasticizer, Into a similar sample was mixed 112.5 g. of paraffin oil plasticizer and 12.5 g. of t-nonyl mercaptan stabilizer. A third sample was treated with 125 g. of t-nonyl mercaptan stabilizer, while a fourth was simply Banbury-mixed without the incorporation of any chemicals. The viscosities before aging at 130° F. for 30 days were 23, 22, 18, and 33, respectively. After aging they were 79, 69, 50, and 109, respectively.

EXAMPLE 6

Table I illustrates the data obtained with various mercaptans. None of the mercaptans which the authors tested were found to be without stabilizing effect. However, it was found that t-alkyl mercaptans possessing higher molecular weight (cf. hexadecyl mercaptan) were less beneficial in their stabilizing effect on reclaim. The mercaptans of Table I were rated for convenience using the following formula:

$$R^t p = \frac{100 \Delta N \text{ Control}}{\Delta N}$$

R represents rating; $t$ stands for aging time in days at 130° F.; $p$ represents percent stabilizer by weight in the reclaims: $\Delta N$ Control and $\Delta N$ signify the increases in viscosity of the control and the stabilized reclaims, respectively.

Table I

| Stabilizer | $p$ | Incorporation | $t$ | R |
|---|---|---|---|---|
| Mercaptoethanol | 2 | Banbury Mixer | 20 | 179 |
| t-Octyl M [1] | 1 | do | 21 | 147 |
| t-Nonyl M | 1 | do | 21 | 157 |
| t-Dodecyl M | 1 | do | 21 | 132 |
| t-Hexadecyl M | 1 | do | 21 | 132 |
| n-Octyl M | 1 | do | 21 | 178 |
| n-Dodecyl M | 1 | do | 20 | 136 |
| Xylyl M | 1 | do | 20 | 208 |
| 2-naphthyl M | 1 | do | 20 | 188 |

[1] M represents mercaptan.

By way of comparison, when a mercaptan salt (such as $Ca(S\phi)_2$ where $\phi$ is the phenyl radical $C_6H_5$ and $p=2$) or a disulfide (such as dicresyl $S_2$ where $p=1$) were added to the reclaim as above, the ratings R were both under 100.

Having thus described our invention, what we claim and desire to protect by Letters Patent is:

1. The method of retarding the decrease in plasticity of a reclaim rubber, said reclaim rubber being substantially free of mercaptans, as hereinafter defined, comprising adding thereto a mercaptan of the formula R—SH, wherein the R is a hydrocarbyl or substituted hydrocarbyl group.

2. The method of retarding the decrease in plasticity of a natural rubber reclaim rubber, a styrene-butadiene copolymer reclaim rubber or mixtures thereof, said reclaim rubber being substantially free of mercaptans, as hereinafter defined, comprising: adding thereto from 0.5% to 10% by weight of a mercaptan having the formula R—SH, wherein the R is a hydrocarbyl or substituted hydrocarbyl group.

3. The method of claim 2 wherein said hydrocarbyl and said substituted hydrocarbyl groups each contain from 4 to 16 carbon atoms.

4. The method of claim 2 wherein said mercaptan is dispersed throughout said reclaim by mixing the said components on a mixing machine.

5. The method of claim 2 wherein said mercaptan is 2-mercaptonaphthalene.

6. The method of claim 2 wherein said mercaptan is 2-mercaptoethanol.

7. The method of claim 2 wherein said mercaptan is t-octyl mercaptan.

8. The method of claim 2 wherein said mercaptan is t-nonyl mercaptan

References Cited by the Examiner

UNITED STATES PATENTS

| | | | |
|---|---|---|---|
| 2,338,427 | 1/1944 | Gumlich et al. | 260—96 X |
| 2,514,661 | 7/1950 | McMillan | 260—45.7 |
| 2,593,279 | 4/1952 | Elgin | 260—2.3 X |
| 2,647,879 | 8/1953 | Sibley | 260—45.7 |
| 2,695,898 | 11/1954 | Lober et al. | 260—608 X |
| 3,025,327 | 5/1962 | May et al. | 260—45.7 |

OTHER REFERENCES

Ball: Manual of Reclaimed Rubber, Rubber Reclaimers Assoc., N.Y., 1956, p. 23.

LEON J. BERCOVITZ, *Primary Examiner.*

DONALD E. CZAJA, *Examiner.*

M. J. WELSH, J. A. KOLASCH, *Assistant Examiners.*